3,209,043
PRODUCTION OF ALKENYL AROMATIC HYDROCARBONS

Norbert F. Cywinski and Harold J. Hepp, Bartlesville, Okla., assignors to Phillips Petroleum Company, a corporation of Delaware
No Drawing. Filed Mar. 8, 1963, Ser. No. 263,751
12 Claims. (Cl. 260—668)

This is a continuation-in-part application of our co-pending application having Serial No. 120,149, filed June 28, 1961, now abandoned.

This invention relates to the formation of alkenyl aromatic hydrocarbons from hydrocarbon-substituted aromatics. In accordance with another aspect, this invention relates to a novel process involving a condensation reaction for the production of alkenyl aromatic hydrocarbons or aryl-substituted olefins from hydrocarbon-substituted aromatics and a 1-acetylene. In a further aspect, this invention relates to the reaction of toluene and acetylene to yield allylbenzene.

Various processes are known for the production of substituted aromatic hydrocarbons from lower molecular weight materials. Some of these known processes employ catalysts while others are purely thermal. However, many of the known processes have various disadvantages for one reason or another. For example, some of the known processes require high temperatures, others requires expensive catalysts, while still others require expensive and difficult to produce reactants. Thus, it can be safely stated that there is still considerable room for improvement in the production of these materials, especially with respect to the provision of a process whereby readily available reactants can be used for the production of valuable aromatic hydrocarbon products.

The present invention relates to a novel process for the production of alkenyl aromatic hydrocarbons by the condensation of hydrocarbon-substituted aromatics and an acetylene.

Accordingly, an object of this invention is to provide a novel process for the production of alkenyl aromatic hydrocarbons.

Another object of this invention is to provide a process for the condensation of hydrocarbon-substituted aromatic hydrocarbons and an acetylene.

It is a further object of this invention to provide a free radical initiated process for producing alkenyl aromatics by condensation of a 1-acetylene and hydrocarbon-substituted aromatics.

Another object of this invention is to provide a process for the production of allylbenzene.

Other objects, aspects, as well as the several advantages of this invention will be apparent to those skilled in the art upon a further study of the specification and the appended claims.

According to the invention set forth in said copending application, we provide a novel process for the production of alkenyl aromatic hydrocarbons which comprises contacting a methyl-substituted aromatic hydrocarbon with an acetylene under suitable reaction conditions of temperature and pressure in the presence of a free radical initiator, and recovering the alkenyl aromatic product thus produced.

It has now been found that substituted aromatic hydrocarbons having a saturated hydrocarbon side chain of 1 to 10, or more, carbon atoms can be reacted with 1-acetylenes in the presence of a free radical initiator to form long chain aryl-substituted monoolefin hydrocarbon products. It has been further found that aryl-substituted 1-olefins can be produced from acetylene and hydrocarbon-substituted aromatic hydrocarbons.

The substituted aromatic hydrocarbon reactants that now can be employed according to the invention have at least 7 carbon atoms per molecule and include mono- and poly-hydrocarbon substituted benzenes as well as mono- and poly-hydrocarbon substituted polycyclic aromatics such as naphthalene, anthracene, chrysene, pyrene, and the like. Although there is no critical upper limit for the molecular weight of the substituted aromatic reactants, generally substituted aromatics containing from 7 to about 24 carbon atoms per molecule are used. In general, the aromatic hydrocarbon reactants of the invention can be defined as compounds having the formula Ar—$CH_2$—R wherein Ar is selected from alkyl-substituted and unsubstituted mono- and polycyclic aromatic hydrocarbons and R is selected from hydrogen and saturated hydrocarbon radicals having from 1 to 10, inclusive, carbon atoms. The hydrocarbon radicals that can be used include specifically saturated aliphatic, saturated cycloaliphatic, and aromatic radicals.

Representative examples of suitable substituted aromatic hydrocarbons that can be employed include toluene, ortho-, meta- and para-xylenes, ethyl-benzene, n-propylbenzene, butylbenzene, octylbenzene, decylbenzene, 1,2,3-trimethylbenzene, 1,2,4-trimethylbenzene, 1,3,5-trimethylbenzene, 1,2-diethylbenzene, 1,2-dipropylbenzene, 1-methylnaphthalene, 2-ethylnaphthalene, 1,4-dipropylnaphthalene, 1-ethyl-8-methylnaphthalene, 1,2,3-trimethylnaphthalene, 1,2,4-trimethylnaphthalene, 1,6,8-trimethylnaphthalene, 1-methylanthracene, 2-ethylanthracene, 1,10-diethylanthracene, 1,2-dipropylanthracene, 1-methylphenanthrene, 2-ethylphenanthrene, 1,2-dimethylphenanthrene, 1,3-diethylphenanthrene, 1-methylchrysene, 2-ethylchrysene, 1,2-dimethylchrysene, 1,3-diethylchrysene, 1-methylpyrene, 2-ethylpyrene, 1,3-diethylpyrene, diphenylmethane, phenylcyclohexylmethane, and the like. It is to be understood that the above-mentioned aromatic hydrocarbons are set forth only as examples of the compounds which can be used in the process of the invention.

The acetylene materials or compounds that can be employed according to the invention are the 1-acetylenes containing from 2 to 5 carbon atoms and include acetylene, 1-propyne, 1-butyne, 1-pentyne, and 3-methyl-1-pentyne and mixtures thereof.

As indicated above, the condensation, reaction of the invention is carried out in the presence of a free radical initiator. Suitable initiators for furnishing free radicals are organic peroxy and azo compounds which have half lives in the range of 0.05 to 20 hours at reaction conditions, actinic radiation, gamma radiation, and metal alkyls of the metals of Groups IIb and IVb of the Periodic System (Mendelyeev).

Representative examples of suitable organic peroxy and azo free radical initiators include di-tert-butyl peroxide, tert-butyl hydroperoxide, benzoyl peroxide, azobisisobutyronitrile, tert-butylbenzene hydroperoxide, dicumyl peroxide, and the like.

Also, according to the invention, actinic rays such as ultraviolet rays which have a photochemical effect can be employed in conjunction with the organic peroxy and azo free radical initiators, in particular, to increase the reaction rate and reduce the temperature and/or time requirement for equivalent conversion. Ultraviolet, for example, assists in starting free radical formation.

When either actinic or gamma radiation is used, the total dosage of radiation to which the reaction mixture is exposed is in the range of $10^6$ to $10^{10}$ roentgens. The rate of exposure to the radiation is generally at the rate of $10^5$ to $10^{11}$ roentgens per hour until said reaction mixture has received said total dosage, although higher or lower rates can be employed.

Numerous sources of gamma rays for irradiation of the hydrocarbons are available. Such sources as spent fuel elements from nuclear reactor are quite satisfactory and may be very economically used, for these are ordinarily allowed only to deteriorate in activity and then reprocessed for recovery of the fissionable material. By using these spent fuel elements in this process, the radiant energy available a gamma rays is put to use in producing valuable alkenyl aromatics. Other sources of gamma rays, of course, may be utilized, for example, radioactive materials such as cobalt-60 and similar radioactive materials. Any other suitable source of gamma radiation can be used.

It is also within the scope of the invention to employ alkyls of the metals of Groups IIb and IVb of the Periodic System (Mendelyeev) including specifically zinc, cadmium, mercury, germanium, tin and lead as free radical initiators. Ordinarily the alkyl groups will contain from 1 to 5, inclusive, carbon atoms, although longer chain alkyl groups can be employed under some circumstances, and the alkyl groups substituted on each metal can be the same or different. Representative examples of suitable metal alkyls that can be used include dimethylzinc, dibutylzinc, diethylcadmium, dimethylmercury, dipropylmercury, diamylmercury, tetraethylgermanium, tetramethyltin, tetraethyllead, and the like.

A discussion of the chemical reactions of tetraethyllead, including its use as a free-radical initiator, can be found on pages 306–318 of "Advances in Chemistry," No. 23, American Chemical Society, 1959. A general discussion on metal alkyls as free radicals can be found in "Free Radicals, an Introduction," Trotman-Dickenson, Wiley, 1959.

Although the mechanism of the reaction involved in the present process is not completely understood, it most probably involves the following reactions between toluene and acetylene, for example, for the production of allyl benzene when a peroxide free-radical initiator is used:

R—O—O—R→2R—O.
R—O.+φCH₃→ROH+φCH₂.
φCH₂.+CH≡CH→φCH₂CH=CH.
φCH₂CH=CH₂.+φCH₃→φCH₂CH=CH₂+φCH₂.

However, the invention is not to be construed as limited by any theory regarding the reaction mechanism. Broadly, the reactions can be expressed as follows when a peroxide free radical initiator is used:

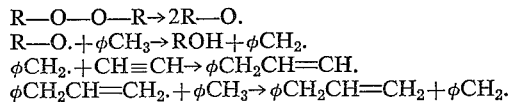

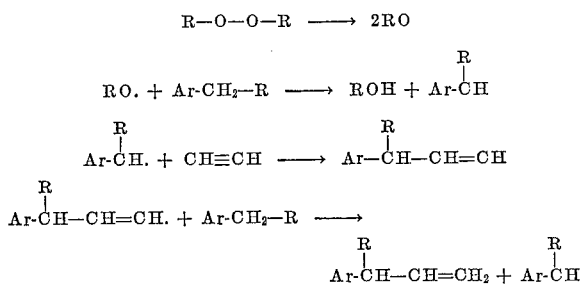

Thus, in carrying out our invention we react, for example, toluene with acetylene and obtain allylbenzene. Similarly, ethylbenzene upon reaction with acetylene yields 3-phenylbutene-1; propylbenzene and acetylene yield 3-phenylpentene-1; 1-ethylnaphthalene and acetylene yield 3-naphthylbutene-1, and the like. It will be observed that long chain aryl-substituted olefins are formed according to the invention by reacting hydrocarbon-substituted aromatics with acetylenes in the presence of a free radical initiator.

The reaction conditions under which the process of the present invention proceeds can vary appreciably and will depend largely upon the reactants and the initiator employed. Generally, temperatures ranging from about 150 to about 700° F., or more, will be used in the reaction, the preferred range being from about 200 to about 650° F.

The reaction pressure employed is sufficient to maintain liquid phase conditions and ordinarily will range from about 50 p.s.i.g. to approximately 2000 p.s.i.g., preferably from about 100 to about 1500 p.s.i.g. The reaction or contact time will ordinarily range from about 0.1 second to about 100 hours, preferably from about 1 second to 10 hours. As indicated above, the use of ultraviolet light in conjunction with the free radical initiator increases the reaction rate and reduces temperature and/or time requirement for equivalent conversion.

The ratio of reactant and initiator employed according to the invention will vary appreciably. Generally, the mole ratio of acetylene material to initiator will range from about 100:1 to about 1:1, preferably from about 50:1 to 5:1. The mole ratio of substituted aromatic to acetylene material will range from about 100:1 to about 2:1, preferably from about 50:1 to about 3:1.

The process of this invention can be effected in any suitable manner and can comprise a batch, intermittent, or continuous type operation. Also, the process of this invention can be carried out in the absence or presence of a non-reactive liquid diluent or solvent. When a batch type operation is used, for example, the substituted aromatic compound can be charged to a reactor (autoclave) first followed by the initiator and an acetylene. Since some of the substituted aromatic hydrocarbon reactants of the invention are solid materials, it is preferred to dissolve such materials in a suitable organic non-reactive solvent such as benzene prior to charging same to the reaction zone. However, as indicated above, any of the known operative procedures can be employed in carrying out the process of the invention.

The usual precautions for handling acetylene under pressure should be observed. Explosions can be prevented in handling acetylene under pressure by dilution with other gases (nitrogen, methane, etc.), operating with limited free space in the lines and vessels in which acetylene is under pressure, and other means known in the art for handling acetylene.

The reaction product obtained according to the present process contains unreacted materials, alkenyl aromatic hydrocarbon materials and higher boiling products. At the completion of the condensation reaction the total reaction mixture can be subjected to any suitable known separation procedure such as distillation, extraction, etc., for recovery of the alkenyl aromatic hydrocarbon product.

It is desirable to keep the reaction system as free of chain terminating components as practicable since the condensation reaction appears to be a chain reaction once it is initiated. Such undesirable materials include mercaptans, quinones, and the like. It is highly desirable, therefore, that the feed components or reactants be freed of these materials as well as other materials which may tend to inhibit the reaction. Any of the known means for removing such contaminants can be used. High feed purity with respect to these undesirable chain terminating components produces higher yields of product based on the initiator.

The alkenyl aromatic hydrocarbon products produced in accordance with the present invention are articles of commerce and have wide utility in the chemical industry. Allyl benzene is very valuable in particular as an intermediate in many chemical processes. For example, allyl benzene is readily isomerized to propenylbenzene by heating in the presence of alcohol KOH. Propylbenzene can be polymerized to homopolymers and copolymers, which are useful as coatings, castings, insulation, adhesives, fibers, etc. Also, a useful antioxidant for resins, drying oils, etc. can be prepared from propenylbenzene by refluxing aniline, aniline hydrochloride and propenylbenzene together to form a condensation product and reacting this product with acetone to make 2,2,4-trimethyl-6-(1-phenylisopropyl)-1,2-dihydroquinoline, which is the antioxidant.

A better understanding of our invention will be obtained upon reference to the following illustrative examples which are not intended, however, to be unduly limitative of the invention.

*Example I*

A run was carried out in which toluene was contacted with acetylene in the presence of di-tert-butyl peroxide to form allylbenzene.

In a 1-liter Magne Dash stirred autoclave, 500 ml. (430 grams, 4.67 mole) of toluene and 100 ml. (78 grams, 0.53 mole) of di-t-butyl peroxide were heated 28 hours at 257° F. using a pressure of 100 p.s.i. of acetylene. Nitrogen was added to a total pressure of 250 p.s.i.g.

The recovered product (517 grams) was washed with water. Some pentane was added at this point to aid in the phase separation. The organic phase was then dried over anhydrous potassium carbonate, 25 ml. of n-decane was added, and the product was distilled through a Minnical column. Eighteen grams of distillate was collected in the range 302 to 349° F. Analysis by gas chromatography indicated that this distillate contained 5.6 grams of allylbenzene. Eighty-nine grams of heavy residue remained after distilling most of the allylbenzene and added n-decane. An infrared spectrum of the center cut of the distillate was identical with that of known allylbenzene.

*Example II*

A run was carried out in which cumene was contacted with acetylene in the presence of di-tert-butyl peroxide. No condensation products of cumene and acetylene were detected in the product.

*Example III*

Another test was carried out in the same manner as Example II except for the temperature, which was 650° F. Again, no condensation product of cumene and acetylene was detected.

*Example IV*

A feed mixture containing 800 ml. (6.54 moles) of ethylbenzene, 1.8 ml. (0.0092 mole) of tetraethyllead, and 2 ml. of normal pentane (as a reference standard for subsequent acetylene analysis) was pressured to 105 p.s.i.g. with nitrogen, and acetylene was added to a total pressure of 130 p.s.i.g. Analysis showed that approximately 2 weight percent of acetylene (0.7 mole) was present in the liquid feed. The mixed feed was pumped through a heated tubular reactor at a temperature of 330° C. (626° F.), a pressure of 1000 p.s.i.g., and a liquid hourly space velocity of 1.0.

Analysis of the product by gas chromatography indicated that 5.3 grams (0.04 mole) of 3-penylbutene-1 was formed. Product identity was further confirmed by infrared and mass spectroscopy.

As will be evident to those skilled in the art, many variations and modifications of this invention can be practiced in view of the foregoing disclosure. Such variations and modifications are clearly believed to come within the spirit and scope of the invention.

We claim:

1. A process for the production of alkenyl aromatics which comprises contacting at elevated temperatures a methyl-substituted aromatic hydrocarbon wherein the aromatic hydrocarbon is selected from alkyl-substituted and unsubstituted mono- and polycyclic aromatic hydrocarbons, said methyl-substituted aromatic hydrocarbon containing from 7 to 24, inclusive, total carbon atoms with at least one acetyenic material selected from the group consisting of acetylene, 1-propyne, 1-butyne, 1-pentyne, and 3-methyl-1-pentyne, in the presence of a chemical free radical initiator selected from the group consisting of organic peroxy compounds which have half lives in the range of 0.05 to 20 hours at reaction conditions, organic azo compounds which have half lives in the range of 0.05 to 20 hours at reaction conditions, and metal alkyls of the metals of Groups IIb and IVb of the Periodic System (Mendelyeev), and recovering said alkenyl aromatic thus produced.

2. A process for the production of allyl aromatics which comprises contacting a methyl-substituted aromatic hydrocarbon wherein the aromatic hydrocarbon is selected from alkyl-substituted and unsubstituted mono- and polycyclic aromatic hydrocarbons, said methyl-substituted aromatic hydrocarbon containing from 7 to 24, inclusive, total carbon atoms with acetylene at a temperature ranging from about 150 to about 700° F. in the presence of an organic peroxy free radical initiator which have half lives in the range of 0.05 to 20 hours at reaction conditions, the mole ratio of acetylene to initiator ranging from about 100:1 to about 1:1, and recovering said allyl aromatic thus produced.

3. A process for the production of allylbenzene which comprises contacting toluene with acetylene at a temperature ranging from about 150 to about 700° F. in the presence of a di-tert-butyl peroxide as the free radical initiator.

4. A process for the production of allylbenzene which comprises contacting toluene with acetylene at a temperature ranging from about 200 to about 650° F. in the presence of di-tert-butyl peroxide, the mole ratio of acetylene to peroxide from about 50:1 to about 5:1 and the ratio of toluene to acetylene ranging from about 50:1 to about 3:1, and recovering allylbenzene as a product of the process.

5. A process for the production of alkenyl aromatic hydrocarbons which comprises contacting (1) a hydrocarbon-substituted aromatic hydrocarbon of the formula Ar—CH$_2$—R wherein R is selected from the group consisting of hydrogen and saturated hydrocarbon radicals of 1 to 10, inclusive, carbon atoms and Ar is an aromatic nucleus selected from the group consisting of alkyl-substituted and unsubstituted mono- and polycyclic aromatic hydrocarbon nuclei, said hydrocarbon-substituted aromatic hydrocarbon containing from 7 to 24, inclusive, total carbon atoms, with (2) at least one acetylenic material selected from the group consisting of acetylene, 1-propyne, 1-butyne, 1-pentyne, and 3-methyl-1-pentyne in the presence of (3) a free radical initiator selected from the group consisting of organic peroxy compounds which have half lives in the range of 0.05 to 20 hours at reaction conditions, organic azo compounds which have half lives in the range of 0.05 to 20 hours at reaction conditions, and metal alkyls of the metals of Groups 11b and IVb of the Periodic System (Mendelyeev) effective for adding said acetylene to a hydrocarbon group on said aromatic to form a long chain alkenyl aromatic, said contacting being effected in an inert reaction diluent at a temperature in the range 150 to 700° F. with a mole ratio of (2) to (3) ranging from 100:1 to 1:1.

6. A process for the production of 3-phenylbutane-1 which comprises contacting ethylbenzene with acetylene at a temperature ranging from 150 to about 700° F. in the presence of tetraethyllead as the free radical initiator.

7. A process for the production of 3-phenylbutene-1 which comprises contacting ethylbenzene with acetylene at a temperature ranging from about 200 to about 650° F. in the presence of tetraethyllead, the mole ratio of acetylene to tetraethyllead ranging from about 100:1 to about 1:1 and the mole ratio of ethylbenzene to acetylene ranging from about 100:1 to about 2:1, and recovering said phenylbutene thus formed as product.

8. A process for the production of alkenyl aromatic hydrocarbons which comprises contacting under reaction conditions a hydrocarbon-substituted aromatic hydrocarbon of the formula Ar—CH$_2$—R wherein R is selected from the group consisting of hydrogen and saturated hydrocarbon radicals selected from the group consisting of saturated aliphatic, saturated cycloaliphatic and aromatic radicals of 1 to 10, inclusive, carbon atoms, and Ar is an aromatic nucleus selected from the group consisting of alkyl-substituted and unsubstituted mono- and polycyclic aromatic hydrocarbon nuclei, said hydrocarbon-substituted aromatic hydrocarbon containing from 7 to 24, inclusive, total carbon atoms, with at least one acetylenic material selected from the group consisting of acetylene, 1-propyne, 1-butyne, 1-pentyne, and 3-methyl-1-pentyne in the presence of an effective initiating amount of a free radical initiator comprising organic peroxy compounds which have half lives in the range of 0.05 to 20 hours at reaction conditions including a temperature ranging from about 150 to about 700° F.

9. A process for the production of alkenyl aromatic hydrocarbons which comprises contacting under reaction conditions a hydrocarbon-substituted aromatic hydrocarbon of the formula Ar—CH$_2$—R wherein R is selected from the group consisting of hydrogen and saturated hydrocarbon radicals selected from the group consisting of saturated aliphatic, saturated cycloaliphatic and aromatic radicals of 1 to 10, inclusive, carbon atoms, and Ar is an aromatic nucleus selected from the group consisting of alkyl-substituted and unsubstituted mono- and polycyclic aromatic hydrocarbon nuclei, said hydrocarbon-substituted aromatic hydrocarbon containing from 7 to 24, inclusive, total carbon atoms, with at least one acetylenic material selected from the group consisting of acetylene, 1-propyne, 1-butyne, 1-pentyne, and 3-methyl-1-pentyne in the presence of an effective initiating amount of a free radical initiator comprising organic azo compounds which have half lives in the range of 0.05 to 20 hours at reaction conditions including a temperature ranging from about 150 to about 700° F.

10. A process for the production of alkenyl aromatic hydrocarbons which comprises contacting under reaction conditions including a temperature ranging from about 150 to about 700° F. a hydrocarbon-substituted aromatic hydrocarbon of the formula Ar—CH$_2$—R wherein R is selected from the group consisting of hydrogen and saturated hydrocarbon radicals selected from the group consisting of saturated aliphatic, saturated cycloaliphatic and aromatic radicals of 1 to 10, inclusive, carbon atoms, and Ar is an aromatic nucleus selected from the group consisting of alkyl-substituted and unsubstituted mono- and polycyclic aromatic hydrocarbon nuclei, said hydrocarbon-substituted aromatic hydrocarbon containing from 7 to 24, inclusive, total carbon atoms, with at least one acetylenic material selected from the group consisting of acetylene, 1-propyne, 1-butyne, 1-pentyne, and 3-methyl-1-pentyne in the presence of an effective initiating amount of a free radical initiator comprising actinic radiation, the total dosage to the reaction mixture being in the range of $10^6$ to $10^{10}$ roentgens.

11. A process for the production of alkenyl aromatic hydrocarbons which comprises contacting under reaction conditions including a temperature ranging from about 150 to about 700° F. a hydrocarbon-substituted aromatic hydrocarbon of the formula Ar—CH$_2$—R wherein R is selected from the group consisting of hydrogen and saturated hydrocarbon radicals selected from the group consisting of saturated aliphatic, saturated cycloaliphatic and aromatic radicals of 1 to 10, inclusive, carbon atoms and Ar is an aromatic nucleus selected from the group consisting of alkyl-substituted and unsubstituted mono- and polycyclic aromatic hydrocarbon nuclei, said hydrocarbon-substituted aromatic hydrocarbon containing from 7 to 24, inclusive, total carbon atoms, with at least one acetylenic material selected from the group consisting of acetylene, 1-propyne, 1-butyne, 1-pentyne, and 3-mehtyl-1-pentyne in the presence of an effective initiating amount of a free radical initiator comprising gamma radiation, the total dosage to the reaction mixture being in the range of $10^6$ to $10^{10}$ roentgens.

12. A process for the production of alkenyl aromatic rydrocarbons which comprises contacting under reaction conditions including a temperature ranging from about 150 to about 700° F. a hydrocarbon-substituted aromatic hydrocarbon of the formula Ar—CH$_2$—R wherein R is selected from the group consisting of hydrogen and saturated hydrocarbon radicals selected from the group consisting of saturated aliphatic, saturated cycloaliphatic and aromatic radicals of 1 to 10, inclusive, carbon atoms, and Ar is an aromatic nucleus selected from the group consisting of alkyl-substituted and unsubstituted mono- and polycyclic aromatic hydrocarbon nuclei, said hydrocarbon-substituted aromatic hydrocarbon containing from 7 to 24, inclusive, total carbon atoms, with at least one acetylenic material selected from the group consisting of acetylene, 1-propyne, 1-butyne, 1-pentyne, and 3-methyl-1-pentyne in the presence of an effective initiating amount of a free radical initiator comprising metal alkyls of the metals of Groups IIb and IVb of the Periodic System (Mendelyeev) wherein the alkyl groups contain from 1 to 5, inclusive, carbon atoms.

References Cited by the Examiner
UNITED STATES PATENTS

| | | | |
|---|---|---|---|
| 2,660,610 | 11/53 | Erchak | 260—668 |
| 2,758,140 | 8/56 | Ipatieff et al. | 260—668 |
| 2,867,673 | 1/59 | Chenicek et al. | 260—668 |
| 3,051,766 | 8/62 | Hunter et al. | 260—668 |

ALPHONSO D. SULLIVAN, *Primary Examiner.*

UNITED STATES PATENT OFFICE
CERTIFICATE OF CORRECTION

Patent No. 3,209,043 September 28, 1965

Norbert F. Cywinski et al.

It is hereby certified that error appears in the above numbered patent requiring correction and that the said Letters Patent should read as corrected below.

Column 5, line 69, for "acetyenic" read -- acetylenic --; column 6, line 56, for "3-phenylbutane-1" read -- 3-phenylbutene-1 --; column 8, line 18, for "3-mehtyl-" read -- 3-methyl- --; line 24, for "rydrocarbons" read -- hydrocarbons --.

Signed and sealed this 21st day of June 1966.

(SEAL)
Attest:

ERNEST W. SWIDER
Attesting Officer

EDWARD J. BRENNER
Commissioner of Patents